United States Patent
Kobayashi et al.

[11] Patent Number: 5,827,626
[45] Date of Patent: Oct. 27, 1998

[54] PRODUCTION OF COLOR FILTER

[75] Inventors: Yuji Kobayashi; Shigeo Tachiki; Toshihiko Akahori; Syoichi Sasaki, all of Hitachi; Kouji Yamazaki; Yoichi Kimura, both of Ichihara, all of Japan

[73] Assignee: Hitachi Chemical Co., Ltd., Tokyo, Japan

[21] Appl. No.: 613,094

[22] Filed: Mar. 8, 1996

[30] Foreign Application Priority Data

Mar. 16, 1995 [JP] Japan ................................ 7-057201

[51] Int. Cl.$^6$ ...................................... G02B 5/20
[52] U.S. Cl. .................................................. 430/7
[58] Field of Search ............................. 430/7, 321, 294; 349/106

[56] References Cited

U.S. PATENT DOCUMENTS 5,573,876  11/1996  Suzuki et al. ............................. 430/7
5,677,385  10/1997  Miyake et al. ......................... 525/286
5,679,485  10/1997  Suzuki et al. ........................... 430/18

FOREIGN PATENT DOCUMENTS 4-164901  6/1992  Japan .

*Primary Examiner*—John A. McPherson
*Attorney, Agent, or Firm*—Antonelli, Terry, Stout & Kraus, LLP

[57] ABSTRACT

A color filter having excellent optical properties can be produced in high yield using a photo-sensitive composition comprising (a) a resin, (b) one or more pigments, (c) one or more monomers, and (d) a photoinitiator to form a film on a substrate, followed by exposure to light and development using a specific developer containing

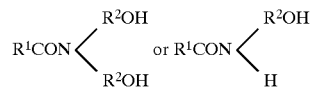

wherein $R^1$ is $C_{1-19}$ alkyl; and $R^2$ is $C_{1-19}$ alkylene.

9 Claims, No Drawings

PRODUCTION OF COLOR FILTER

BACKGROUND OF THE INVENTION

This invention relates to a process for producing a color filter, a kit for producing the color filter, and the color filter thus produced.

Recently, color filters are widely used in liquid crystal display devices, sensors and color separation devices. These color filters have been produced by patterning a resin which can be dyed such as natural gelatin or casein, dying the patterned resin using a dye mainly to give picture cells. But the resulting picture cells have a problem in that heat resistance and light resistance are low due to the nature of the resin and dye used.

In order to improve the heat resistance and light resistance, there is recently noticed a process wherein a photosensitive material dispersing one or more pigments therein is used. Such a process is also studied from various aspects. According to such a process, the production steps are simplified and the resulting color filter is stable and has a long life. But development technique used in such a process is very difficult. Further, it is difficult to meet the requirements in the developing time, resolution and development residue at the same time.

SUMMARY OF THE INVENTION

It is an object of the present invention to provide a process for producing a color filter overcoming the problems of the prior art, particularly improving the developing time, resolution and development residue when pigments are dispersed in a photosensitive material, and to provide a color filter thus produced.

It is another object of the present invention to provide a kit for producing the color filter using a special colored image forming material and a developer particularly suitable for the colored image forming material for improving coating appearance, resolution and development residue.

In particular, this invention is directed to a process for producing a color filter, which comprises the steps of:

forming a film of colored image forming material comprising
(a) a resin having an acid value of 20 to 300 and a weight-average molecular weight of 1,500 to 200,000,
(b) one or more pigments,
(c) one or more monomers having one or more photopolymerizable unsaturated bonds in the molecule, and
(d) a photoinitiator on a substrate, exposing the film to actinic light imagewisely so as to photocure exposed portions of the film, removing unexposed portions from the film to form picture cells or a matrix by using a developer containing a compound of the formula:

a compound of the formula:

wherein $R^1$ is an alkyl group having 1 to 19 carbon atoms; and $R^2$ is an alkylene group having 1 to 19 carbon atoms, and, if necessary, repeating the above-mentioned steps for individual different colored image forming materials, respectively, to form a plurality of different colored picture cells.

This invention also comprises the color filter thus produced.

Furthermore, this invention is directed to a kit for producing a color filter, said kit comprising (A) a colored image forming material comprising
(a) a resin having an acid value of 20 to 300 and a weight-average molecular weight of 1,500 to 200,000,
(b) one or more pigments,
(c) one or more monomers having one or more photopolymerizable unsaturated bonds in the molecule,
(d) a photoinitiator, and
(e) a solvent in a container, and (B) a developer containing a compound of the formula:

a compound of the formula:

wherein $R^1$ is an alkyl group having 1 to 19 carbon atoms; and $R^2$ is an alkylene group having 1 to 19 carbon atoms, in a separate container.

DESCRIPTION OF THE PREFERRED EMBODIMENTS

In accordance with the present invention, the color filter is produced by:

forming a film of a photo-sensitive colored image forming material comprising
(a) a resin having an acid value of 20 to 300 and a weight-average molecular weight of 1,500 to 200,000,
(b) one or more pigments,
(c) one or more monomers having one or more photopolymerizable unsaturated bonds in the molecule, and
(d) a photoinitiator on a substrate, exposing the film to actinic light imagewisely so as to photocure exposed portions of the film, removing unexposed portions from the film to form picture cells or a matrix using a developer containing a compound of the formula:

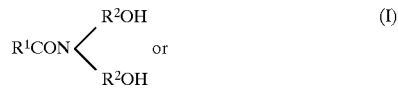

a compound of the formula:

wherein $R^1$ is an alkyl group having 1 to 19 carbon atoms; and $R^2$ is an alkylene group having 1 to 19 carbon atoms, and, if necessary, repeating the above-mentioned steps for individual different colored image forming materials, respectively, to form a plurality of different colored picture cells.

As the resin (a) in the colored image forming material, there is used a resin having an acid value of 20 to 300 and a weight-average molecular weight of 1,500 to 200,000. Typical examples of the resin (a) are copolymers of at least one carboxyl group-containing polymerizable monomer and at least one other copolymerizable monomer. Examples of the carboxyl group-containing polymerizable monomer are acrylic acid, methacrylic acid, itaconic acid, maleic acid, maleic anhydride, maleic acid monoalkyl esters, etc. Examples of the other copolymerizable monomer are acrylic esters, methacrylic esters, styrene, etc.

The copolymers may contain photopolymerizable unsaturated bonds. As the copolymers containing photopolymerizable unsaturated bonds, there can be used a resin obtained by reacting a carboxyl group-containing resin also having hydroxyl groups with a free isocyanate group-containing unsaturated compound; a resin obtained by reacting an addition reaction product of an epoxy resin and an unsaturated carboxylic acid with a polybasic acid anhydride; a resin obtained by reacting a conjugated diene polymer or an addition reaction product of a conjugated diene copolymer and an unsaturated dicarboxylic acid anhydride with a hydroxyl group-containing polymerizable monomer; a resin obtained by reacting a high acid value carboxyl group-containing resin with a glycidyl group-containing unsaturated compound (e.g., glycidyl acrylate, glycidyl methacrylate, allyl glycidyl ether, etc.) or an unsaturated alcohol (e.g., allyl alcohol, 2-hydroxyethyl acrylate, 2-hydroxyethyl methacrylate, etc.), etc.

Among these copolymers, preferable resins are those consisting essentially of repeating units represented by the formula:

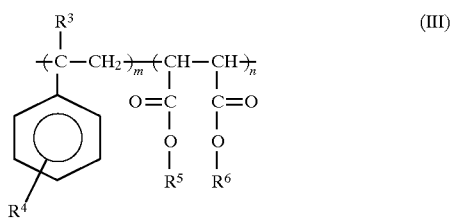

wherein $R^3$ is a hydrogen atom or a methyl group; $R^4$ is a hydrogen atom, a hydroxyl group, an alkyl group, or an alkoxy group; $R^5$ is an alkyl group; $R^6$ is a hydrogen atom, an alkyl group or an organic group which may have one hydroxy group and has a photo-reactive unsaturated bond; and m and n are independently an integer of 1 or more.

In the formula (III), the number of carbon atom in the alkyl group defined by $R^4$, $R^5$ or $R^6$ is preferably 1 to 12. When the number of carbon atoms is more than 12, there is a tendency to lower developing properties. Further, the number of carbon atoms in the alkoxy group defined by $R^4$ is preferably 1 to 12. When the number of carbon atoms is more than 12, there is a tendency to lower developing properties.

The resins mentioned above can be used singly or as a mixture thereof.

The resins represented by the formula (III) are preferably copolymers of styrene or a styrene derivative and a maleic acid monoalkyl ester. When maleic acid or maleic anhydride is used in place of the maleic acid monoalkyl ester, there is a tendency to undesirably lower the yield of the copolymer.

As the styrene or styrene derivatives, there can be used styrene, α-methylstyrene, m- or p-methoxystyrene, p-hydroxystyrene, 2-methoxy-4-hydroxystyrene, 2-hydroxy-4-methylstyrene, etc.

As the maleic acid monoalkyl esters, there can be used monomethyl maleate, monoethyl maleate, mono-n-propyl maleate, mono-isopropyl maleate, mono-n-butyl maleate, mono-n-hexyl maleate, mono-n-octyl maleate, mono-2-ethylhexyl maleate, mono-n-nonyl maleate, mono-n-dodecyl maleate, etc.

The molar ratio of the styrene or a derivative thereof to the maleic acid monoalkyl ester [i.e. m/n in the formula (III)] is preferably in the range of 1/1 to 5/1. When the molar ratio is less than 1, there is a tendency to lower heat resistance and resistance to a developer. On the other hand, when the molar ratio is more than 5, there is a tendency to lower developing properties.

As to the resin represented by the formula (III), it is desirable to make photo-reactive unsaturated bonds present therein in order to improve photo sensitivity and to make carboxyl groups present therein in order to make alkali development possible.

Introduction of the photo-reactive unsaturated bonds into the resin can be attained by subjecting the copolymer of styrene or a derivative thereof and a maleic acid monoalkyl ester to esterification reaction using an unsaturated alcohol such as allyl alcohol, 2-butene-4-ol, furfuryl alcohol, oleyl alcohol, cinnamyl alcohol, 2-hydroxyethyl acrylate, 2-hydroxyethyl methacrylate, N-methylolacrylamide, etc. It is also possible to subject the copolymer of styrene or a derivative thereof and a maleic acid monoalkyl ester to addition reaction with a compound having an oxirane ring and an ethylenically unsaturated bond such as glycidyl methacrylate, glycidyl acrylate, allyl glycidyl ether, α-ethylglycidyl acrylate, crotonylglycidyl ether, itaconic acid monoalkyl monoglycidyl ester, etc.

In such cases, when a compound obtained by esterification reaction of maleic acid or maleic anhydride with an unsaturated alcohol, or a compound obtained by addition reaction of compounds having an oxirane ring and an ethylenically unsaturated bond, is used in the copolymerization with styrene or a derivative thereof, there is a tendency to cause gelation undesirably due to reaction of unsaturated groups during the copolymerization.

The unsaturation equivalent weight in the thus obtained disperse resin is preferably in the range of 600 to 3000, more preferably 800 to 2000. When the unsaturation equivalent weight is less than 600, there is a tendency to partly cure the resin during dispersion with pigments. On the other hand, when the unsaturation equivalent value is more than 3000, there is a tendency to lower the improving effect of photo sensitivity. The term "unsaturation equivalent weight" means a molecular weight of the resin per unsaturated bond.

The acid value of the resin (a) is in the range of 20 to 300, preferably 40 to 200, more preferably 60 to 150. When the acid value is less than 20, the alkali developing properties are lowered, while when the acid value is over 300, the shape of image pattern becomes unclear.

The weight-average molecular weight (measured by gel permeation chromatography (GPC) and calculated as polystyrene) of the resin (a) is in the range of 1,500 to 200,000, preferably 5,000 to 100,000, more preferably 10,000 to 50,000. When the weight-average molecular weight is less than 1,500, dispersion stability of pigments becomes poor, while when the weight-average molecular weight is more than 200,000, the viscosity of photo-sensitive solution of colored image forming material becomes undesirably high to lower coating properties.

The amount of the resin (a) in 100 parts by weight of the colored image forming material comprising the components (a), (b), (c) and (d) is preferably 10 to 85 parts by weight, more preferably 20 to 60 parts by weight, and particularly preferably 25 to 50 parts by weight. When the amount is less than 10 parts by weight, there is a tendency to lower the dispersion stability of pigments. On the other hand, when the amount is more than 85 parts by weight, there is a tendency to undesirably increase the viscosity of photo-sensitive solution of colored image forming material to lower coating properties at the time of spin coating.

In addition to the resin (a), it is possible to use one or more other binder resins conventionally used such as acrylic resins, epoxy resins, urethane resins, melamine resins, etc. in an amount of 50 parts by weight or less per 100 parts of the resin (a). When the amount of the other binder resin is more than 50 parts by weight, there is a tendency to lower dispersion stability of pigments and photo sensitivity.

As the pigment (b) in the colored image forming material, there can be used inorganic pigments and organic pigments. From the abundance of color tones, organic pigments are usually used in addition to inorganic black pigments such as carbon black and graphite. Particle size of each pigment is preferably 1 μm or less and about 0.05 μm in average.

As the organic pigments, there can be used azo series, phthalocyanine series, indigo series, anthraquinone series, perylene series, quinacridone series, methine•azomethine series, and isoindolinone series pigments.

When the colored image forming material is applied to a color filter, individual pigments suitable for colored images such as red, green, blue and black images are used.

In the case of a red color image, there can be used a single red pigment or a mixture of a red pigment and a yellow pigment. When a mixture of a red pigment and a yellow pigment is used, the yellow pigment is preferably used in an amount of 50 parts by weight or less based on 100 parts by weight of a total of the red pigment and the yellow pigment.

As the red pigments, there can be used C.I. Pigment Red 9, 123, 155, 168, 177, 180, 217, 220, 224, etc.

As the yellow pigments, there can be used C.I. Pigment Yellow 20, 24, 83, 93, 109, 110, 117, 125, 139, 147, 154, etc.

These red pigments and yellow pigments can be used singly or as a mixture thereof.

In the case of a green color image, there can be used a single green pigment or a mixture of a green pigment and a yellow pigment mentioned above. When a mixture of a green pigment and a yellow pigment is used, the yellow pigment is preferably used in an amount of 50 parts by weight or less based on 100 parts by weight of a total of the green pigment and the yellow pigment.

As the green pigments, there can be used C.I. Pigment Green 7, 36, 37, etc.

These green pigments and yellow pigments can be used singly or as a mixture thereof.

In the case of a blue color image, there can be used a single blue pigment or a mixture of a blue pigment and a violet pigment. When a mixture of a blue pigment and a violet pigment is used, the violet pigment is preferably used in an amount of 50 parts by weight based on 100 parts by weight of a total of the blue pigment and the violet pigment.

As the blue pigments, there can be used C.I. Pigment Blue 15, 15:3, 15:4, 15:6, 22, 60, etc.

As the violet pigments, there can be used C.I. Pigment Violet 19, 23, 29, 37, 50, etc.

These blue pigments and violet pigments can be used singly or as a mixture thereof.

In the case of a black color image, there can be used black pigments such as carbon black, graphite, titanium carbon, black iron oxide, manganese dioxide, etc.

The amount of the pigments (b) in 100 parts by weight of the colored image forming material comprising the components (a), (b), (c) and (d) is preferably 5 to 70 parts by weight, more preferably 10 to 40 parts by weight, particularly preferably 10 to 36 parts by weight, especially preferably 16 to 25 parts by weight. When the amount is less than 5 parts by weight, there is a tendency to make a color density of image too low. On the other hand, when the amount is more than 70 parts by weight, there is a tendency to lower photo sensitivity.

As the component (c), there can be used one or more monomers having one or more photo-polymerizable unsaturated bonds in the molecule. Examples of such monomers (c) are methyl methacrylate, benzyl methacrylate, butoxyethyl methacrylate, butoxyethyl acrylate, butoxytriethylene glycol acrylate, epichlorohydrin (ECH)-modified butyl acrylate, dicyclopentanyl acrylate, ethylene oxide(EO)-modified dicyclopentenyl acrylate, N,N-dimethylaminoethyl methacrylate, ethyldiethylene glycol acrylate, 2-ethylhexyl acrylate, glycerol methacrylate, heptadecafluorodecyl acrylate, 2-hydroxyethyl methacrylate, caprolactone-modified 2-hydroxyethyl acrylate, isobornyl acrylate, methoxydipropylene glycol acrylate, methoxylated cyclodecatriene acrylate, phenoxyhexaethylene glycol acrylate, EO-modified phosphoric acrylate, caprolactone-modified tetrahydrofurfuryl acrylate, EO-modified bisphenol A diacrylate, ECH-modified bisphenol A diacrylate, bisphenol A dimethacrylate, 1,4-butanediol diacrylate, 1,3-butylene glycol diacrylate, diethylene glycol dimethacrylate, glycerol dimethacrylate, neopentyl glycol diacrylate, EO-modified phosphoric diacrylate, ECH-modified phthalic diacrylate, polyethylene glycol (400) diacrylate, polypropylene glycol (400) dimethacrylate, tetraethylene glycol diacrylate, ECH-modified 1,6-hexanediol diacrylate, trimethylolpropane triacrylate, pentaerythritol triacrylate, EO-modified phosphoric triacrylate, EO-modified trimethylolpropane triacrylate, propylene oxide (PO)-modified trimethylolpropane triacrylate, tris(methacryloxyethyl) isocyanurate, pentaerythritol tetraacrylate, dipentaerythritol tetraacrylate, dipentaerythritol hexaacrylate, dipentaerythritol pentaacrylate, etc.

The amount of the monomers (c) in 100 parts by weight of the colored image forming material comprising the components (a), (b), (c) and (d) is preferably 2 to 50 parts by weight, more preferably 5 to 40 parts by weight, particularly preferably 10 to 30 parts by weight. When the amount is less than 2 parts by weight, there is a tendency to make the photo sensitivity too low. On the other hand, when the amount is more than 50 parts by weight, there is a tendency to lower the dispersion stability of pigments.

As the component (d), there is used a photoinitiator. Examples of the photoinitiator are benzophenone, N,N'-tetraethyl-4,4'-diaminobenzophenone, 4-methoxy-4'-dimethylaminobenzophenone, benzyl, 2,2-diethoxyacetophenone, benzoin, benzoin methyl ether, benzoin isobutyl ether, benzyl dimethyl ketal, α-hydroxy isobutylphenone, thioxanthone, 2-chlorothioxanthone, 1-hydroxy cyclohexyl phenyl ketone, 2-methyl-1-[4-

(methylthio)phenyl]-2-morpholino-1-propane, t-butylanthraquinone, 1-chloroanthraquinone, 2,3-dichloroanthraquinone, 3-chloro-2-methylanthraquinone, 2-ethylanthraquinone, 1,4-naphthoquinone, 9,10-phenanthraquinone, 1,2-benzanthraquinone, 1,4-dimethylanthraquinone, 2-phenylanthraquinone, 2-(o-chlorophenyl)-4,5-diphenyl imidazole dimer, etc. These photoinitiators can be used singly or as a mixture thereof.

The amount of the photoinitiator (d) in 100 parts by weight of the colored image forming material comprising the components (a), (b), (c) and (d) is preferably 0.01 to 20 parts by weight, more preferably 2 to 15 parts by weight, particularly preferably 5 to 10 parts by weight. When the amount is less than 0.01 part by weight, there is a tendency to make the photo sensitivity too low. On the other hand, when the amount is more than 20 parts by weight, there is a tendency to lower adhesiveness of the film of colored image forming material to the substrate.

The colored image forming material may contain various additives, if necessary, in addition to the components (a), (b), (c) and (d) mentioned above. Examples of such additives are a thermal polymerization inhibitor such as hydroquinone, hydroquinone monomethyl ether, pyrogallol, t-butyl catechol, etc.; a silane coupling agent having a vinyl group, an epoxy group, an amino group, a mercapto group, etc., a titanate coupling agent (such as isopropyl trimethacryloyl titanate, diisopropyl isostearoyl-4-aminobenzoyl titanate, etc.) for improving adhesiveness to the substrate; surfactants (such as fluorine series, silicone series, hydrocarbon series) for improving smoothness of the film; ultraviolet absorbents; antioxidants; etc.

The colored image forming material can be added with (e) an organic solvent to give a photo-sensitive solution. The photo-sensitive solution can directly be coated on a substrate, or a photo-sensitive element obtained by coating the photo-sensitive solution on a support, followed by drying can be laminated on the substrate to form the film of colored image forming material on the substrate surface.

The resulting substrate is exposed to light, and developed to give the desired image pattern.

Examples of the organic solvent (e) are diethylene glycol mono- or di-alkyl ethers such as diethylene glycol monomethyl ether, diethylene glycol monoethyl ether, diethylene glycol monopropyl ether, diethylene glycol monobutyl ether, diethylene glycol dimethyl ether, diethylene glycol diethyl ether, diethylene glycol dipropyl ether, diethylene glycol dibutyl ether, etc.; diethylene glycol monoalkyl ether acetates such as diethylene glycol monomethyl ether acetate, diethylene glycol monoethyl ether acetate, diethylene glycol monopropyl ether acetate, diethylene glycol monobutyl ether acetate, etc.; ethylene glycol monoalkyl ethers such as ethylene glycol monomethyl ether, propylene glycol monomethyl ether, ethylene glycol monoethyl ether, ethylene glycol monopropyl ether, etc.; ethylene glycol dialkyl ethers such as ethylene glycol dimethyl ether, ethylene glycol diethyl ether, ethylene glycol dipropyl ether, etc.; lactones such as β-lactone, γ-lactone, δ-lactone, etc.; methylmethoxy propionate, ethylmethoxy propionate, ethylethoxy propionate, methylethoxy propionate; methyl ethyl ketone, tetrahydrofuran, dioxane, toluene, N-methyl pyrrolidone, etc. These organic solvents can be used singly or as a mixture thereof.

The organic solvent (e) is used preferably in an amount so as to make the total solid content of the components including the resin (a), the pigments (b), the monomers (c) and the photoinitiator (d) in the photo-sensitive solution 5 to 40% by weight.

As the coating method of the photo-sensitive solution directly on the substrate, there can be used a roll coater coating a spin coater coating, a spray coating, a whirler coating, a dip coater coating, a curtain flow coater coating, a wire bar coater coating, a gravure coater coating, air knife coater coating, etc.

As the substrate, there can be used transparent glass substrates (e.g., white plate glass, blue plate glass, silica-coated blue plate glass), synthetic resin-made sheets (e.g., sheets of polyester resin, polycarbonate resin, acrylic resin, polyvinyl chloride resin, etc.), metal substrates (e.g., an aluminum plate, a copper plate, a nickel plate, a stainless steel plate, etc.), ceramic substrates, semiconductor substrates having an opto-electric conversion elements, etc.

After coating the photo-sensitive solution on the substrate, drying at usually 50° to 130° C. for 1 to 30 minutes is conducted to give the film.

As to the method of laminating the photo-sensitive element obtained by coating the photo-sensitive solution on the support and drying on the substrate, the photo-sensitive solution can be coated on the support by a knife coater coating, a gravure coater coating, a roll coater coating or a spray coater coating.

As the support, there can be used a plastic film such as a polyester film, a polyimide film, a polyamideimide film, a polypropylene film, a polystyrene film, etc.

The photosensitive element can be obtained by drying the photo-sensitive solution on the support usually at 50° to 130° C. for 1 to 30 minutes as in the case of direct coating of the photo-sensitive solution on the substrate. Further, in order to prevent adhesion of dust on the surface of the film, it is desirable to laminate a peelable cover film on the film surface.

As the peelable cover film, there can be used a polyethylene film, a polytetrafluoroethylene film, a polypropylene film, a surface-treated paper sheet, etc. It is preferable to use a cover film having a bonding strength to the film of the colored image forming material smaller than the bonding strength between the film and the support.

The thus obtained photo-sensitive element can be laminated on the substrate by piling the film of the colored image forming material on the substrate, followed by pressing with heating. In such a case, the atmosphere can be either under a normal pressure or a reduced pressure.

The thickness of the film of colored image forming material formed on the substrate is preferably in the range of 0.1 to 300 μm depending on the purposes. When the film is used for a color filter, the thickness is preferably in the range of 0.2 to 5 μm.

In the present invention, the image pattern can be formed as follows.

The film formed on the substrate is exposed to actinic light imagewisely to cure the exposed portions.

In this case, when the film is formed by using the photo-sensitive element, the exposure to light can be carried out while attaching the support or after peeling from the support. Further, even in the case of forming the film on the substrate by direct coating, it is possible to cover the film surface with an oxygen-excluding film made of, for example, polyvinyl alcohol of 0.5 to 30 μm thick, followed by exposure to light.

As a light source of actinic light, there can be used a carbon arc lamp, a ultra-high pressure mercury lamp, a high pressure mercury lamp, a xenon lamp, a metal halide lamp, a fluorescent lamp, a tungsten lamp, a visible light laser, etc. Using such a light source, actinic light is irradiated imagewisely by a pattern exposure via a photomask or a direct picturing using scanning.

Next, a development step and a developer used therein are explained.

As the developer for the film of colored image forming material, there is used a developer containing a compound of the formula:

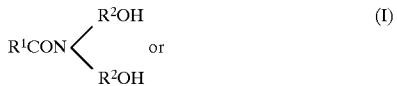

a compound of the formula:

wherein $R^1$ is an alkyl group having 1 to 19 carbon atoms; and $R^2$ is an alkylene group having 1 to 19 carbon atoms.

The compound of the formula (I) or (II) can be produced by reacting a fatty acid of the formula:

with a dialkylolamine or monoalkylolamine of the formula:

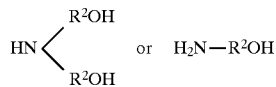

in a molar ratio of fatty acid/dialkylolamine or monoalkylolamine of 1/1 to 1/5 with heating.

The compound of the formula (I) or (II) can be either a linear-chain state or a branched state so long as $R^1$ is an alkyl group having 1 to 19 carbon atoms and $R^2$ is an alkylene group having 1 to 19 carbon atoms. Among the compounds of the formula (I) or (II), those having an alkyl group of 3 to 14 carbon atoms as $R^1$ and an alkylene group of 1 to 8 carbon atoms as $R^2$ are preferable for improving the properties and excellent in stability and life of the developer; those having an alkyl group of 4 to 9 carbon atoms as $R^1$ and an alkylene group of 2 to 4 carbon atoms as $R^2$ are more preferable for improving the properties and more excellent in stability and life of the developer; and those having an alkyl group of 6 or 7 carbon atoms as $R^1$ and an alkylene group of 2 or 3 carbon atoms as $R^2$ are particularly preferable. When the carbon number of alkyl group is more than 19, water solubility and developing properties are lessened. Further, when the carbon number of alkylene group is more than 19, water solubility and developing properties are lessened.

Examples of the compounds of the formula (I) or (II) are butyric acid diethanolamide (or diethanol

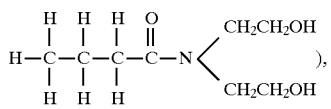

butyric acid dibutanolamide, valeric acid diethanolamide, valeric acid dihexanolamide, isovaleric acid diethanolamide, methylethyl acetate dipropanolamide, caproic acid diethanolamide, caproic acid dioctanolamide, enanthic acid diethanolamide, enanthic acid dipropanolamide, enanthic acid diisopropanolamide, enanthic acid dibutanolamide, enanthic acid dihexanolamide, enanthic acid dioctanolamide, enanthic acid di-2-ethylhexylalcoholamide, caprilic acid dioctanolamide, caprilic acid di-2-ethylhexylalcoholamide, caprilic acid diethanolamide, caprilic acid dipropanolamide, caprilic acid dibutanolamide, caprilic acid dioctanolamide, pelargonic acid diethanolamide, pelargonic acid dipropanolamide, capric acid diethanolamide, capric acid dipropanolamide, undecyl acid diethanolamide, lauric acid diethanolamide, tridecylic acid diethanolamide, tridecylic acid dipropanolamide, tridecylic acid dibutanolamide, myristic acid dimethanolamide, pentadecylic acid dimethanolamide, pentadecylic acid diethanolamide, butyric acid monoethanolamide, butyric acid monobutanolamide, valeric acid monoethanolamide, valeric acid monohexanolamide, caproic acid monoethanolamide, caproic acid monooctanolamide, enanthic acid monoethanolamide, enanthic acid monopropanolamide, caprilic acid monoethanolamide, caprilic acid monopropanolamide, caprilic acid monoisopropanolamide, caprilic acid monobutanolamide, caprilic acid monohexanolamide, caprilic acid monooctanolamide, caprilic acid mono-2-ethylhexylalcoholamide, pelargonic acid monoethanolamide, pelargonic acid monopropanolamide, capric acid monoethanolamide, capric acid monopropanolamide, undecylic acid monoethanolamide, lauric acid monoethanolamide, tridecylic acid monoethanolamide, tridecylic acid monopropanolamide, tridecylic acid monobutanolamide, myristic acid monoethanolamide, pentadecylic acid monomethanolamide, pentadecylic acid monoethanolamide, etc. These compounds can be used singly or as a mixture thereof.

It is preferable to use the compound of the formula (I) or (II) in an amount of preferably 0.1 to 20 parts by weight, more preferably 0.5 to 15 parts by weight, particularly preferably 1 to 10 parts by weight, per 100 parts by weight of the developer (including water). When the amount is less than 0.1 part by weight, there is a tendency to make developing properties insufficient. On the other hand, when the amount is more than 20 parts by weight, there is a tendency to make picture cells easily be peeled from the substrate.

The developer used in the present invention may be prepared by dissolving or dispersing the compound of the formula (I) or (II) in water. The developer may further contain one or more inorganic alkali (e.g., sodium carbonate, potassium carbonate, sodium hydroxide, potassium hydroxide, etc.) and organic bases (e.g., triethanolamine, diethanolamine, butylamine, phenylhydrazine, tetramethylammonium hydroxide, etc.) preferably in an amount of 10 parts by weight or less per 100 parts by weight of the developer (including water). When the amount is more than 10 parts by weight, there is a tendency to form picture cells which are easily peeled from the substrate.

The developer may further contain one or more defoaming agents and surfactants depending on purposes.

The development can be carried out by spraying the developer or dipping in the developer to remove unexposed portions. As a result, a colored image pattern of the cured film corresponding to the image can be obtained. After the development, it is preferable to conduct washing with water.

Further, after the development, it is preferable to conduct post exposure by subjecting the colored image pattern to exposure to light at 0.5 to 5 $J/cm^2$ using, for example, a high pressure mercury lamp, or to conduct post heating by subjecting the colored image pattern to exposure to heat at 60° to 200° C. for 1 to 60 minutes, for making the image pattern stronger.

In the case of producing the color filter used in liquid crystal display devices, for example, a photo-sensitive solution containing the colored image forming material comprising the components (a), (b), (c) and (d), and an organic solvent (e) is coated on a glass substrate, directly or indirectly, followed by exposure to light and development, and repeating the abovementioned steps to form red, green, blue, and the like colored picture cells, followed by formation of black colored image as a black matrix in spaces among the colored picture cells. Alternatively, it is possible to form a black matrix on the glass substrate first by, for example, a chromium deposition or formation of black colored image, followed by formation of red, green, blue and the like colored images.

In order to conduct the process of the present invention in separate stages, the present invention also provides a kit for producing a color filter, said kit comprising (A) a colored image forming material comprising These components of the kit may be packaged together, e.g. plastic wrapped or boxed. Prior to use of the developer, this embodiment requires exposure of the film to photocure portion of the film.

It should be noted that the developer (B) exhibits its effects most effectively when applied to the colored image forming material (A).

The present invention is illustrated by way of the following Examples, in which all parts and percents are by weight, unless otherwise specified.

In the following Examples, the resins shown in Table 1 were used.

The resin A was obtained by reacting a styrene/maleic anhydride copolymer with glycidyl methacrylate.

TABLE 1

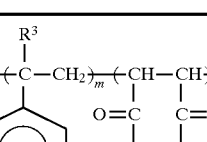

(a) a resin having an acid value of 20 to 300 and a weight-average molecular weight of 1500 to 200,000,
(b) one or more pigments,
(c) one or more monomers having one or more photopolymerizable unsaturated bonds in the molecule,
(d) a photoinitiator, and
(e) a solvent, the components (a) to (e) being stored in a container or coated on a support as a photosensitive element and dried to remove solvent, and (B) a developer containing a compound of the formula:

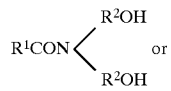

a compound of the formula:

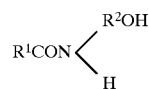

wherein $R^1$ is an alkyl group having 1 to 19 carbon atoms; and $R^2$ is an alkylene group having 1 to 19 carbon atoms, and water, said developer being stored in a separate container.

EXAMPLE 1

The components shown in Table 2 were used.

TABLE 2

| Component | Colored image forming material | Amount (g) |
|---|---|---|
| (a) | Resin A shown in Table 1 | 10 |
| (b) | Carbon black | 38 |
|  | Diethylene glycol dimethyl ether | 200 |
| (c) | Trimethylolpropane triacrylate | 32 |
| (d) | Benzophenone | 12 |
|  | N,N'-tetraethyl-4,4'-diaminobenzophenone | 4 |

The component (a) was added to the component (b) and dispersed by using a beads mill for 2 hours. To the resulting dispersion, the component (c), the component (d) and 200 g of diethylene glycol dimethyl ether (e) were added and mixed to give a photo-sensitive solution for forming a black color image.

The resulting photo-sensitive solution was spin coated on a glass substrate (7059, a trade name, mfd. by Corning Japan Co.; conditions: coating amount 20 g, 1100 r.p.m., 10 seconds), followed by drying at 110° C. for 5 minutes to form a film of 1.0 μm thick.

The resulting film was exposed to light at 700 mJ/cm² imagewisely through a negative mask using an ultra-high pressure mercury lamp, followed by development by spraying at 25° C. using an aqueous solution containing 5% enanthic acid diethanolamide.

The developing time, resolution of image and development residue were evaluated and shown in Table 6.

EXAMPLE 2

The components shown in Table 3 were used.

TABLE 3

| Component | Colored image forming material | Amount (g) |
|---|---|---|
| (a) | Resin A shown in Table 1 | 30 |
| (b) | C. I. Pigment Red 177 | 21 |
|  | C. I. Pigment Yellow 139 | 4 |
| (c) | Pentaerythritol tetra-acrylate | 32 |
| (d) | Benzophenone | 6 |
|  | N,N'-tetraethyl-4,4'-diaminobenzophenone | 2 |

The components (a) and (b) were added to 200 g of diethylene glycol dimethyl ether (e) and dispersed using a beads mill for 2 hours. To the resulting dispersion, the components (c) and (d) and 200 g of diethylene glycol dimethyl ether were added and mixed to give a photo-sensitive solution for forming red color image.

The resulting photo-sensitive solution was coated on a glass substrate and dried in the same manner as described in Example 1 to give a film of 2.0 μm thick.

The resulting film was exposed to light at 100 mJ/cm² imagewisely through a negative mask using an ultra-high pressure mercury lamp, followed by development using an aqueous solution of 1% of lauric acid diethanolamide and 2% of diethanolamine.

The developing time, resolution of image, and development residue were evaluated and shown in Table 6.

EXAMPLE 3

The components shown in Table 4 were used.

TABLE 4

| Component | Colored image forming material | Amount (g) |
|---|---|---|
| (a) | Resin A shown in Table 1 | 40 |
| (b) | C. I. Pigment Green 36 | 15 |
|  | C. I. Pigment Yellow 83 | 5 |
| (c) | Trimethylolpropane triacrylate | 32 |
|  | Benzophenone | 6 |
| (d) | N,N'-tetraethyl-4,4'-diaminobenzophenone | 2 |

The components (a) and (b) were added to 200 g of diethylene glycol diethyl ether (a) and dispersed using a beads mill for 2 hours. To the resulting dispersion, the components (c) and (d), and 200 g of diethylene glycol diethyl ether were added and mixed to give a photo-sensitive solution for forming green color image.

The resulting photo-sensitive solution was coated on a glass substrate and dried in the same manner as described in Example 1.

The resulting film was exposed to light in the same manner as described in Example 2 and developed using an aqueous solution of 1% of enanthic acid monoethanolamide and 3% of triethanolamine.

The developing time, resolution of image, and development residue were evaluated and shown in Table 6.

EXAMPLE 4

The components shown in Table 5 were used.

TABLE 5

| Component | Colored image forming material | Amount (g) |
|---|---|---|
| (a) | Resin B shown in Table 1 | 40 |
| (b) | C. I. Pigment Blue 15-6 | 17 |
|  | C. I. Pigment Violet 23 | 1 |
| (c) | Pentaerythritol tetraacrylate | 34 |
|  | Benzophenone | 6 |
| (d) | N,N'-tetraethyl-4,4'-diaminobenzophenone | 2 |

The components (a) and (b) were added to 200 g of diethylene glycol dimethyl ether (e) and dispersed using a beads will for 2 hours. To the resulting dispersion, the components (c) and (d) and 200 g of diethylene glycol dimethyl ether were added and mixed to give a photo-sensitive solution for forming blue color image.

The resulting photo-sensitive solution was coated on a glass substrate and dried in the same manner as described in Example 1.

The resulting film was exposed to light in the same manner as described in Example 2 and developed using an aqueous solution of 2% of caprilic acid dipropanolamide.

The developing time, resolution of image, and development residue were evaluated and shown in Table 6.

EXAMPLE 5

On a glass substrate forming a black matrix thereon by chromium deposition, a red color image pattern was formed in the same manner as described in Example 2, followed by heating at 180° C. for 10 minutes. Then, using the same substrate, a green color image pattern was formed neighboring to the red color image pattern in the same manner as described in Example 3, followed by heating at 180° C. for 10 minutes. After that, using the resulting substrate, a blue color image pattern was formed neighboring to the green color image pattern in the same manner as described in Example 4, followed by heating at 200° C. for 10 minutes.

As a results, there was obtained a color filter having mosaic picture cells of red, green and blue colors, each picture cell having a size of 30 μm×100 μm.

EXAMPLE 6

On a glass substrate, a black image pattern (a black matrix) with 20 μm wide was formed in the same manner as described in Example 1, followed by heating at 205° C. for 20 minutes.

Then, in the same manner as described in Example 5, there was obtained a color filter having mosaic picture cells of red, green and blue colors, each picture cell having a size of 30 μm×100 μm.

Comparative Example 1

The process of Example 1 for forming the black color image was repeated except for using as a developer an aqueous solution containing 5% of diethanolamine.

The developing time, resolution of image, and development residue were evaluated and shown in Table 6.

Comparative Example 2

The process of Example 4 for forming the blue color image was repeated except for using as a developer an aqueous solution containing 1% of sodium carbonate.

The developing time, resolution of image, and development residue were evaluated and shown in Table 6.

TABLE 6

| Example No. | Developing time (sec.) | Resolution (μm) | Development residue | Heat resistance |
|---|---|---|---|---|
| Example | | | | |
| 1 | 8 | 3 | None | ○ |
| 2 | 25 | 3 | None | ○ |
| 3 | 23 | 3 | None | ○ |
| 4 | 14 | 3 | None | Δ |
| Comparative Example | | | | |
| 1 | 45 | 7 | Yes | — |
| 2 | 38 | 7 | Yes | — |

Note)
The developing time was evaluated by the minimum developing time (sec.) until an image appears when subjected to a spray development (spray pressure: 0.1 kg/mm²).
The heat resistance was evaluated by heating a sample at 260° C. for 1 hour and observing a color change. ○ No color change. Δ slightly colored.

As is clear from the results shown in Table 6, when the developer of the present invention is used (Examples 1 to 4), the developing time can be shortened compared with the case of using developers outside the present invention (Comparative Examples 1 to 2). Further, the resolution in Examples 1 to 4 is higher than that of Comparative Examples 1 and 2. No development residue was admitted in Examples 1 to 4. Particularly, the developer used in Example 1 is not only excellent in shortening in the developing time but also excellent in not foaming at spraying.

When such an excellent developer is used, the resulting color filters (e.g. obtained in Examples 5 and 6) are excellent in optical properties (degree of depolarization being 700 or more) and effective as image display elements.

According to the present invention, the color filters excellent in optical properties and high in quality can be produced with high workability in high yield.

What is claimed is:

1. A process for producing a color filter, which comprises the steps of:
   forming a film of colored image forming material comprising
   (a) a resin having an acid value of 20 to 300 and a weight-average molecular weight of 1,500 to 200,000,
   (b) one or more pigments,
   (c) one or more monomers having one or more photopolymerizable unsaturated bonds in the molecule, and
   (d) a photoinitiator on a substrate,
   exposing the film to actinic light imagewisely so as to photocure exposed portions,
   removing unexposed portions from the film to form picture cells or matrix using a developer comprising
   a compound of the formula:

a compound of the formula:

wherein $R^1$ is an alkyl group having 1 to 19 carbon atoms; and $R^2$ is an alkylene group having 1 to 19 carbon atoms, and if necessary,
   repeating the above-mentioned steps for individual different colored image forming materials, respectively, to form different colored picture cells or a matrix.

2. A process according to claim 1, wherein the picture cells are red, green and blue picture cells, which are formed by using red, green and blue image forming materials, respectively.

3. A process according to claim 2, wherein the matrix are black matrix, which are formed by using a black image forming material.

4. A color filter obtained by the process of claim 3.

5. A color filter obtained by the process of claim 2.

6. A process according to claim 1, wherein the matrix are black matrix, which are formed by using a black image forming material.

7. A color filter obtained by the process of claim 6.

8. A process according to claim 1, wherein the resin (a) is a copolymer having repeating units of the formula:

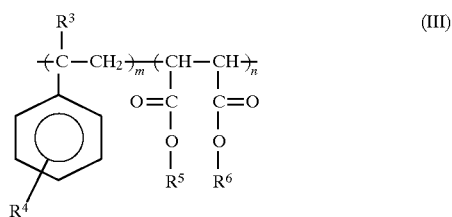

wherein $R^3$ is a hydrogen atom or a methyl group; $R^4$ is a hydrogen atom, a hydroxyl group, an alkyl group, or an alkoxy group; $R^5$ is an alkyl group; $R^6$ is a hydrogen atom, an alkyl group or an organic group which may have one hydroxy group and has a photo-reactive unsaturated bond; and m and n are independently an integer of 1 or more, and wherein n and $R^6$ are selected such that the resin (a) has said acid value of 20 to 300.

9. A color filter obtained by the process of claim 1.

* * * * *